June 9, 1925.
H. VALLOS
BROILER
Filed Aug. 6, 1923
1,541,011
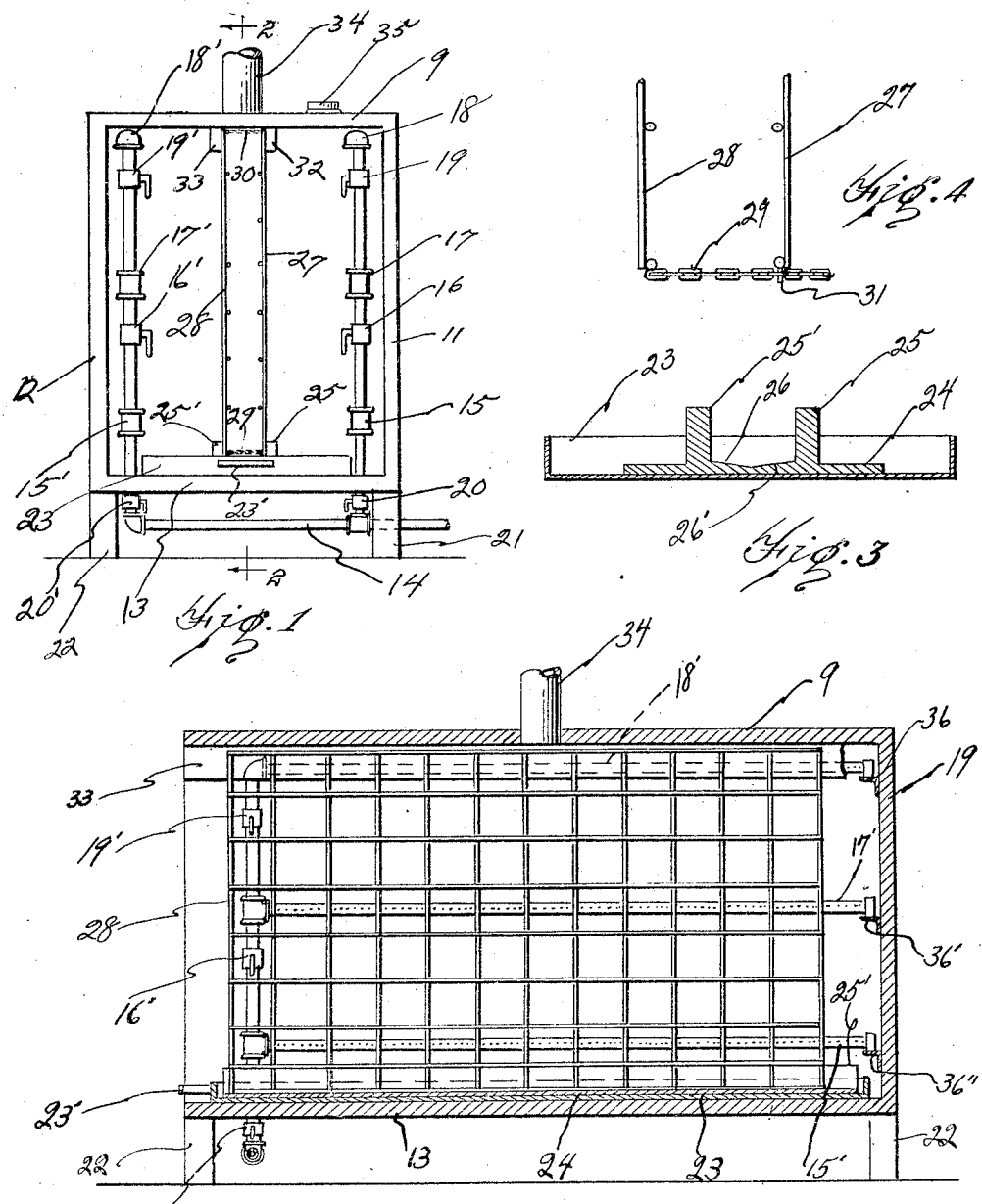
INVENTOR.
Harry Vallos
BY
Thos. S. Donnelly
ATTORNEY Patented June 9, 1925.

1,541,011

UNITED STATES PATENT OFFICE.

HARRY VALLOS, OF DETROIT, MICHIGAN.

BROILER.

Application filed August 6, 1923. Serial No. 655,929.

*To all whom it may concern:*

Be it known that I, HARRY VALLOS, a citizen of the United States, residing at Detroit, in the county of Wayne and State of Michigan, have invented new and useful Improvements in a Broiler, of which the following is a specification.

My invention relates to a new improvement in a broiler, and has for its object the provision of a broiler which will be simple in structure, economical of manufacture, and highly efficient in use.

Another object of my invention is the provision in a broiler of means for directing heat from both sides toward the material broiled at the same time.

Another object of the invention is the provision in a broiler of a housing having heating means at opposite sides thereof adapted for directing heat toward the center thereof and provided with means for retaining in upright position a screen for holding the material to be broiled.

Another object of the invention is the provision of drip collecting means whereby the juices exuding from the material being broiled may be saved and easily collected.

Other objects will appear hereinafter.

The invention consists in the combinations and arrangements of parts hereinafter described and claimed.

The invention will be best understood by reference to the accompanying drawings which form a part of this specification and in which, Fig. 1 is a front elevational view of the invention, Fig. 2 is a sectional view taken on substantially line 2—2 of Fig. 1, Fig. 3 is a transverse sectional view of the drip pan and screen retaining means, and Fig. 4 is a fragmentary side elevational view of the locking means used on the screen.

The invention in its preferred form comprises a housing having a top wall 9, side walls 11 and 12, and a base 13. Extending transversally of the housing is a gas pipe 14 which communicates at opposite sides of the housing with vertically extending pipes from which project horizontally extending pipes 15 and 15′, 17 and 17′, 18 and 18′. A valve 20 and a valve 20′ are mounted in their respective upwardly extending pipes so as to control the flow of gas therethrough. To control the flow of gas into the pipe 17 and 17′, valves 16 and 16′ are provided in the upwardly extending pipes. Similar valves 19 and 19′ are provided for controlling the flow of gas into the pipes 18 and 18′ so that the heat delivered to the housing may be regulated as desired, depending upon the nature of the material to be broiled and the time desired for broiling the same. The housing is provided with legs 21 and 22 which are positioned at the four corners of the housing and serve to support the same. A drip pan 23, which is provided at the front side thereof with a handle 23′ is adapted for insertion into the housing by sliding the same on the base 13. Mounted in the pan 23 is a retaining member for supporting the screen 27 and the screen 28 in upright position. This supporting member comprises a base having surfaces 26 and 26′ which are inclined toward each other. The base is also provided with flanges 24 projecting upwardly from which are longitudinally extending guide members 25 and 25′, made integral with the base. The screens 27 and 28 are made of any suitable wiring adapted for use with broilers. Mounted on the edge of the screen 28 is a chain 29, which is adapted to loop over a stud 31 formed on the screen 27. A similar chain 30 is mounted on the screen 28 at the upper edge thereof. The number of these chains is optional and depends largely upon the length of the screens with which they are used.

In operation material to be broiled is placed on the screen 28 and the screen 27 is then pressed closely against it, then locked in engagement with it by means of the chains 29 and 30. The screens are then placed between the members 25 and 25′. The pan 23 is then pushed into the housing, the upper edges of the screens 27 and 28 engaging between the guide members 32 and 33 which are integral with and project downwardly from the inner surface of the wall 9. An exhaust pipe 34 is mounted in the housing for the purpose of carrying away the vapors arising therein. Mounted on the upper wall of the housing is an alarm 35 which may be set to ring an alarm at definite intervals so that the operator by regulating the heat may set the alarm to sound at the time the material being broiled is sufficiently cooked.

The rearward ends of the pipes 15', 17', 18' and 15, 17 and 18 are supported by angle irons 36, 36' and 36'' mounted on the rear wall 39 of the housing.

While I have illustrated and described the preferred form of construction, I do not wish to limit myself to the precise details of structure set out but desire to avail myself of such variations and modifications as come within the scope of the appended claims.

Having thus described my invention what I claim is:

1. A broiler comprising a housing; a food retainer comprising a screen adapted for insertion into said housing; guide members spaced apart and projecting downwardly from the roof of said housing, said guide members being adapted for retaining said food retainer in upright position; a drip pan; and a guide member adapted for mounting in said drip pan, and for engaging the opposite sides said food retainer at its lower edge.

2. A broiler comprising a housing; a pair of guide members spaced apart and projecting downwardly from the roof of said housing said guide members extending throughout the length of said housing; a drip pan adapted for mounting in said housing; a food retainer adapted for positioning between said guide members; and guide members mounted in said pan extending throughout length thereof and adapted for engaging said food retainer at opposite sides adjacent its lower edge.

3. A broiler comprising a housing; a pair of guide plates extending along the roof of said housing and projecting downwardly therefrom; a drip pan adapted for mounting in said housing; a guide member adapted for mounting in said housing said guide member comprising a base and having pair of longitudinally extending guide members projecting upwardly therefrom; and a food container adapted for engagement at its opposite ends between said pairs of guide members.

In testimony whereof I have signed the foregoing specification.

HARRY VALLOS.